Aug. 21, 1956  W. J. REAVIS  2,759,236
FASTENER FOR SLIP COVERS
Filed July 2, 1953
Fig. 1.
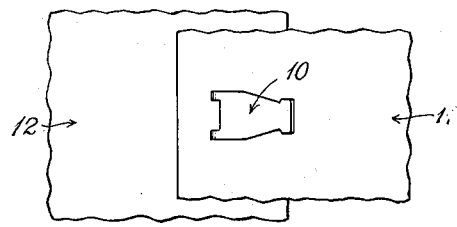
Fig. 2.
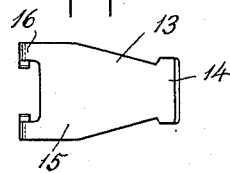
Fig. 5.  Fig. 3.  Fig. 6.
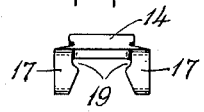 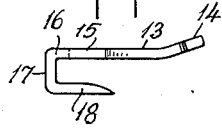 
Fig. 7.  Fig. 4.
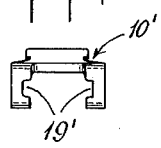 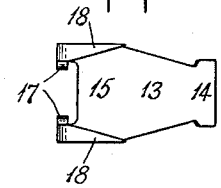
INVENTOR.
WILLIAM J. REAVIS
BY
ATTORNEYS United States Patent Office 2,759,236
Patented Aug. 21, 1956

2,759,236

FASTENER FOR SLIP COVERS

William J. Reavis, Hanover, Md., assignor to The Comfy Manufacturing Company, Baltimore, Md., a corporation of Maryland Application July 2, 1953, Serial No. 365,685

6 Claims. (Cl. 24—152)

This invention relates to devices for connecting two pieces of fabric together and has for its primary object the provision of an improved fastener which may be removably hooked to separate panels of a slip cover to secure the slip cover properly in place on an upholstered piece of furniture.

Another object of the invention is to provide an improved fastener of the indicated type which may be readily attached to a slip cover to hold parts thereof together on a chair, and which will effectively maintain such assembly of the slip cover parts during use of the slip cover and until the fastener has been positively manipulated to separate such slip cover parts.

A further object of the invention is to provide an improved fastener of the indicated type which is extremely simple in construction and which may be made in large quantities at relatively lost cost.

Other objects of the invention, as well as the advantages and features of construction of the instant fastener, will become apparent after a perusal of the following description, when read in connection with the accompanying drawings, in which Fig. 1 is a top plan view of a fastener constructed in accordance with the invention and illustrating the manner in which it attaches two panels of a slip cover together;

Fig. 2 is an enlarged top plan view of the fastener per se;

Fig. 3 is a side view of the fastener;

Fig. 4 is a bottom plan view of the fastener;

Fig. 5 is an end view of the fastener looking toward the left of Fig. 3;

Fig. 6 is an end view of the fastener looking toward the right of Fig. 3, and

Fig. 7 is an end view similar to Fig. 5 showing a modified form of the invention.

Referring to Figs. 1 to 6 of the drawings, the fastener illustrated thereby is designated by the reference numeral 10. It may be formed of a piece of stamped metal having sufficient inherent rigidity to prevent the prongs from being bent out of operative position with relation to the plate 10 during the use of the fastener. Any suitable metal may be used, such as steel, brass, etc. and the metal may be coated in any suitable manner.

The plate 10 includes a substantially rectangularly-shaped end section 15, a tapering central section 13 and a substantially rectangularly-shaped end section 14 of shorter length than the sections 13 and 15, but having a greater width than the adjacent reduced end of section 13. End section 15 is flat and so is section 13 for a major portion of its length. The remainder of section 13 and section 14 are bent upwardly to provide a finger piece which may be firmly gripped between the thumb and first finger of the user's hands in manipulating the fastener.

Extending from the outer end edge of section 15 of the fastener plate are two spaced hooks or prongs, each of which has a base or root section 16 which extends for a short distance longitudinally of the plate 10, and is disposed substantially in the plane of section 15 of such plate. Integral with the root section 16 of each prong, is an inner or intermediate section 17 which is disposed substantially at right angles to section 16. The outer end section 18 of each hook is disposed at right angles to the intermediate portion 17 thereof and in parallelism with the section 15 of plate 10. The angle of bend at the juncture of the inner surfaces of hook sections 17 and 18 is sharp and is preferably a true 90° angle. The hook section 18 has a length substantially equal to the length of plate section 15, so that its outer end terminates approximately at the juncture of the flat portion of plate section 13 with plate section 15.

It will be noted that the outer side edges of the two hooks or prongs are formed from continuations of the longitudinal edges of plate section 15, and are in generally parallel relation. The inner side edge of hook section 18 however, is inclined with respect to the outer side edge thereof and throughout the entire length of such section, so that such section tapers to a point. The inner surface of the pointed end of hook section 18 is tapered so that such section terminates in a sharp point. The incline of the inner side edge of hook section 18 extends into the intermediate hook section 17 to a point between the top and bottom ends of such section 17 (note Fig. 5). At the termination of such incline, the upper end of section 17 is cut away or notched at 19, and such cut-out or notch extends into the root section 16 of the prong to the end edge of plate section 15. It will thus be seen that each prong gradually increases in width from the point thereof, throughout the length of section 18 thereof, and to a point between the top and bottom ends of section 17 thereof, and that from such point of greatest width of the hook or prong, a notch 19 is provided to form a definite shoulder at such point and to reduce the width of such prong from such point to the plate section 15.

In use, the fastener is gripped by the user as previously described, and the prongs thereof passed through the outer fabric panel 11 of a slip cover. The sharp pointed ends of the hooks or prongs will pass through or between threads of the fabric and as the hooks are inserted through the fabric, such threads or thread portions thereof will be gradually forced apart until the notches 19 are reached, whereupon the threads will tend to return to normal condition and the fastener will be securely locked in position on the fabric by the shoulders formed by the notches 19 catching a plurality of the threads of the fabric. The fastener thus cannot be disengaged from the fabric of panel 11 except by positive action of the user. After the two slip cover panels 11 and 12 have been properly adjusted on the chair, the hooks or prongs are passed through the fabric material of panel 12. If the hooks are forced sufficiently far through panel 12, the latter will also become locked to the fastener in the manner explained with respect to panel 11. However, by reason of the sharp bend of hook sections 18 and the parallelism of such sections with the plate section 15, the inner panel 12 will be effectively secured to panel 11 by the fastener, even though the prongs are not inserted sufficiently far enough through panel 12 to bring the material thereof into the notches 19 of such fastener. The effectiveness of the hook sections 18 in maintaining the connection of the two slip cover panels is increased by the fact that when tension is placed on the panels, the fastener, if the panel 12 is not caught in the notches 19, pivots or moves relative to the fabric until the plate 10 comes into engagement with the tensioned outer panel 11. When this occurs, the material of the inner panel 12 comes into the sharp corners between hook sections 17 and 18, and as the plate 10 is prevented from further movement by panel 11, the material of panel 12 will be maintained in such pronged corners. The stronger the pull tending to separate the panels, the more securely will the panels be held by the prongs of the fastener. The plate 10 thus in effect, exerts a leverage action to prevent possible separation of the two pieces of fabric. Even if there is not sufficient tension in the outer fabric panel 11 to prevent further inward movement of the plate 10 under certain conditions of usage, it has been found that the sharp 90° bend at the juncture of the inner surfaces of prong sections 17 and 18 and the parallelism of the prong sections 18 with flat plate sections 15, will effectively prevent the inner fabric panel 12 riding over the prong sections 18 to become disengaged from the fastener. When the user desires to separate the fabric panels 11 and 12 to remove the slip cover from the chair, this may readily be accomplished by manipulating the fastener. Due to the conformation of the finger manipulating portion of the fastener, the length of the prong sections 18 and their flat, parallel relation with the plate section 15, there is no danger of the fastener injuring the user or becoming caught on other materials.

It will be readily apparent from the drawings, that the construction of the fastener is such that it can be economically manufactured in large numbers from strips of stock without waste. The hooks or prongs are made from the side edges of the strip when the sections 13 and 14 of a previous fastener are cut out from the strip. Thus by initially forming the prongs of the first fastener on one end of a strip, a complete fastener blank will be formed by every stroke of the cutting die. The prongs can thereafter be readily fashioned into the form illustrated by known methods.

In the embodiment of Fig. 7 of the drawings, the notches 19' on the prongs of the fastener 10' are shown as being completely contained in the inner or intermediate vertical portions of such prongs. This construction has the advantage that the two layers of fabric of which the slip cover panels are constituted, may more readily be brought together to provide a straight line tension on such panels through the material of the prongs when the slip cover is assembled on a chair.

While I have described and illustrated the primary purpose for which the fastener of this invention was constructed, it will be apparent to those skilled in the art that the fastener may be used to equal advantage for other purposes. It will also be apparent to those skilled in the art that other modifications may be made in the fastener without departing from the spirit of the invention or the scope of the appended claims.

I claim:

1. A fastener for connecting two fabric portions together comprising a rigid body formed of sheet stock, a finger portion provided on one end of said body, two hooks projecting from the other end of said body for fastening said body on two fabric portions, said hooks being substantially rigid and each having an inner section disposed at generally right angles to said body portion and having an outer pronged section extending from said inner section in a direction at generally right angles thereto and disposed in spaced, substantial parallelism to a portion of said body the outer pronged sections of said hooks having inner side edges converging toward said inner sections, and means on the inner side edge of the inner section of at least one of said hooks for locking said fastener on the fabric.

2. A fastener for connecting two fabric portions together comprising a rigid body formed of sheet stock, a finger portion provided on one end of said body, two hooks projecting in spaced relation from the other end of said body for fastening said body on two fabric portions, said hooks being substantially rigid and each having an inner section disposed at generally right angles to said body portion and having an outer pronged section extending from said inner section in a direction at generally right angles thereto and disposed in spaced, substantial parallelism to said body, the outer pronged sections of said hooks having inner side edges converging toward said inner sections and the inner section of at least one of said hooks being formed to provide a recess on the inner side edge thereof between said pronged section and said body to receive fabric material pierced by the pronged section of such hook and thereby lock the fastener on such fabric.

3. A fastener for connecting two fabric portions together comprising a rigid body formed of sheet stock, one end of said body being inclined to one side of the longitudinal axis of said body to provide a finger piece, two hooks projecting in spaced relation from the other end of said body for fastening said body on two fabric portions, said hooks being substantially rigid and each having an inner section extending from said body on the other side of the longitudinal axis of said body and in a direction at generally right angles to such body, and having an outer pronged section extending from said inner section in a direction at generally right angles thereto and disposed in spaced, substantial parallelism to said body, the outer pronged sections of said hooks having inner side edges converging toward said inner sections and the inner sections of said hooks being formed to provide opposed recesses on the inner side edges thereof to receive fabric material pierced by the outer pronged sections of such hooks and thereby lock the fastener on such fabric.

4. A fastener for connecting two fabric portions together, comprising a rigid body formed of sheet stock, a finger portion provided on one end of said body, two hooks projecting from the other end of said body for fastening said body to two fabric portions, said hooks being substantially rigid and each having an inner section disposed transversely to said body portion and having an outer pronged section extending transversely from said inner section and disposed in spaced overlying relation and in substantial parallelism to a portion of said body, said pronged section being gradually tapered from the pointed end thereof throughout its length by an inner side edge converging toward said inner section and such taper continuing into said inner section to a point intermediate the ends of said inner section, at least one of said inner prong sections beyond such point being reduced in width to form a fabric thread catching shoulder on the inner side edge of such inner section at such point in the length of said inner section.

5. A fastener for connecting two fabric portions together, comprising a rigid body formed of sheet stock, a finger portion provided on one end of said body, two hooks projecting from the other end of said body for fastening said body to two fabric portions, said hooks being substantially rigid and each having an inner section disposed transversely to said body portion and having an outer pronged section extending transversely from said inner section and disposed in spaced overlying relation and in substantial parallelism to a portion of said body, the outer side edges of said hooks being generally parallelly disposed and forming a continuation of the longitudinal edges of the overlapped portion of said body, and the inner side edges of said hooks being inclined with respect to the outer side edges thereof from the pointed ends thereof, throughout the entire length of the outer pronged sections thereof and to a point intermediate the ends of said hooks, said inclined inner side edges being disposed in converging relation from the pointed ends of said hooks and the inner side edge of at least one of said hooks beyond such intermediate point being recessed to form an inner fabric thread catching shoulder at such point in the length of the hooks.

6. A fastener for connecting two fabric portions together, comprising a rigid body formed of sheet stock, a finger portion provided on one end of said body, two hooks projecting from the other end of said body for fastening said body to two fabric portions, said hooks being substantially rigid and each having a root section projecting longitudinally from a flat portion of said body and contained in the plane of the latter, a straight intermediate section disposed transversely to said root section and a straight outer pronged section extending transversely from said inner section and disposed in spaced overlying relation and in substantial parallelism to such flat portion of said body, the outer side edges of said hooks forming a continuation of the longitudinal edges of the overlapped flat portion of said body, and the inner side edges of said hooks being inclined with respect to the outer side edges thereof from the pointed ends thereof, throughout the entire length of the outer pronged sections thereof and to a point intermediate the ends of said hooks, said inclined inner side edges being disposed in converging relation from the pointed ends of said hooks, said hooks beyond such intermediate point being reduced in thickness to form on the inner side edges thereof a pair of opposed fabric thread catching shoulders at such point in the length of the hooks.

References Cited in the file of this patent

UNITED STATES PATENTS

| | | |
|---|---|---|
| 277,396 | Winchester | May 8, 1883 |
| 303,398 | Phillips | Aug. 12, 1884 |
| 1,358,902 | Ward | Nov. 16, 1920 |
| 1,750,992 | Clark | Mar. 18, 1930 |
| 1,787,143 | Clark | Dec. 30, 1930 |
| 1,843,703 | Boden | Feb. 2, 1932 |
| 2,573,809 | Reiter | Nov. 6, 1951 |